United States Patent
Åberg et al.

(10) Patent No.: US 8,440,936 B2
(45) Date of Patent: May 14, 2013

(54) WELDING POWER SUPPLY

(75) Inventors: Per Åberg, Laxå (SE); Thomas Carlsson, Kristinehamn (SE); Hannes Löfgren, Gävle (SE); Per Tingö, Laxå (SE)

(73) Assignee: ESAB AB, Goteborg (SE)

( * ) Notice: Subject to any disclaimer, the term of this patent is extended or adjusted under 35 U.S.C. 154(b) by 554 days.

(21) Appl. No.: 12/599,754

(22) PCT Filed: May 5, 2008

(86) PCT No.: PCT/SE2008/050503
§ 371 (c)(1),
(2), (4) Date: Mar. 19, 2010

(87) PCT Pub. No.: WO2008/140398
PCT Pub. Date: Nov. 20, 2008

(65) Prior Publication Data
US 2011/0056923 A1 Mar. 10, 2011

(30) Foreign Application Priority Data
May 11, 2007 (SE) .................................... 0701146

(51) Int. Cl.
*B23K 9/10* (2006.01)
(52) U.S. Cl.
USPC .................................................. 219/130.32
(58) Field of Classification Search .................. None
See application file for complete search history.

(56) References Cited

U.S. PATENT DOCUMENTS 6,111,216 A * 8/2000 Stava ..................... 219/130.51
6,472,634 B1 * 10/2002 Houston et al. ........... 219/130.5

FOREIGN PATENT DOCUMENTS

WO 02083351 A1 10/2002

* cited by examiner

*Primary Examiner* — Hoai V Ho
*Assistant Examiner* — James G Norman
(74) *Attorney, Agent, or Firm* — Kacvinsky Daisak PLLC

(57) ABSTRACT

A welding power supply (1) for supply of current to a welding electrode (2), and a method and a computer program for controlling such a welding power supply is described. The welding power supply (1) comprises an output (3) for output of current from the welding power supply (1), and a control unit (9) for controlling the welding power supply (1). The control unit (9) is arranged to control the welding power supply (1) to supply current to the output (3) in the form of a series of alternating positive current pulses (11), having a positive top value (Imax+), and negative current pulses (12), having a negative top value (Imax), and to lower the current in the current pulses from the negative top value (Imax) and the positive top value (Imax+) to a negative switch value (Ix−) and a positive switch value (Ix+), respectively, before switch between a positive current pulse (11) and a negative current pulse (12). The control unit (9) is arranged to control, in dependence of the current from the output and a first set point, the welding power supply (1) at least with regard to one of the point of time for lowering of the current in the current pulses and the level for at least one of the negative switch value (Ix−) and the positive switch value (Ix+).

27 Claims, 2 Drawing Sheets

WELDING POWER SUPPLY

TECHNICAL FIELD

The present invention relates to a welding power supply for arc welding. Especially the present invention relates to a welding power supply arranged for arc welding with alternating positive and negative current pulses. The invention also relates to a method for controlling the current in such a welding power supply.

DESCRIPTION OF THE PRIOR ART

Welding is a well known method for joining metal objects such as for example plates. There are a number of different welding methods of which arc welding is one. During arc welding a high current is provided which is transmitted from a welding electrode in a welding tool to the work piece/work pieces in order to join the work pieces. The high current lead to the creation of an arc which melts parts of the work piece/work pieces and possibly also the welding electrode. In some cases it is preferable to use alternating current to drive the arc, so called AC-arc welding. AC-arc welding is advantageous to use for example during welding in aluminium. During AC-arc welding the current will, thus, alternately be directed from the welding electrode and to the welding electrode.

A welding power supply for AC-arc welding usually comprises an input for mains and a rectifier connected to the input for production of direct-current voltage. The output of the rectifier is connected to an inverter in which the direct-current is transformed to a high frequency alternating-current voltage. The high frequency alternating-current voltage is transformed to a lower voltage and is rectified in order to be fed to a switching net with a welding output which switching net alternately feeds a positive voltage and a negative voltage to the welding output and the welding electrode connected to the welding output. During positive periods and negative periods, respectively. The size of the current during the positive and the negative may usually be set in order to fit the welding mission to be accomplished.

During the transitions between positive and negative voltage to the welding output and the welding electrode the switching net is controlled so that the current to the output is first cut off whereupon current is fed in the opposite direction. In the welding cables between the output and the welding electrode and the output and the work piece, respectively, there is, however, an inductance which results in that the current cannot change direction momentarily. Furthermore, the cut-off of the current to the output will lead to that a high voltage is built up in the switching net. This high voltage may be harmful to the switching net and the power supply. The voltage depends among other things on the inductance in the welding cables which in turn depends on the length and position of the welding cables.

Except for the high voltages which may arise during switching between positive and negative voltage due to the inductance in the welding cables and the switching net, said inductance may also lead to the current not being able to reach the set size during the positive and the negative period, respectively.

A further problem which may arise during switching between positive and negative current pulses is strong sounds which may be annoying to the operator of the welding power supply.

In the U.S. Pat. No. 6,111,216 a solution to the problem with the voltages being built up during switching between positive and negative potential on the output of the power supply is described. In the power supply which is described in said US patent the inverter is turned off some time before the switching between positive and negative current. The current through the welding cables will then slowly decay. When the current has reached a predetermined level the current direction is changed. Thanks to the current having been decreased to a lower level before it is controlled to switch direction a smaller voltage peak is obtained during the switching than what should have been the case if the switching had taken place from the original level.

A problem with the solution which is described in the US patent is, however, that the rectified mean value of the current during the welding becomes lower due to this turning off of the inverter a time before the switch of the current direction. If the inductance in the welding cables is large the time for the decay of the current may be substantial. This may lead to an instable arc during the welding which in turn may lead to an inferior welding result.

As the time for the decay of the current, besides the design of the power supply and the length of the welding cables, also depends on the position of the welding cables the time for the decay of the current may vary during the welding. This leads to the point of time for the switching of the current direction to be undefined. This leads to that a desired set frequency for the switching of the current cannot be held.

SUMMARY OF THE INVENTION

An object of the present invention is to provide a welding power supply which at least partly sets aside one of the above described problems.

A further object of the present invention is to provide a welding power supply with a current output, which welding power supply is arranged to decrease the current before switching of the current from positive polarity to negative polarity on the current output in such a way that the rectified mean value of the current is held at a sufficiently high level in order to enable welding with a good result.

Another object of the present invention is to provide a method for controlling a welding power supply, which method at least partly sets aside one of the above described problems.

A further object of the present invention is to provide a method for controlling a welding power supply with a current output, so that the current is decreased before switching of the current from positive polarity to negative polarity on the current output in such a way that the rectified mean value of the current is held at a sufficiently high level in order to enable welding with a good result.

At least one of these objects is fulfilled with a welding power supply or a method according to the appended independent claims.

Further advantages of the invention are provided with the features in the following dependent claims.

A welding power supply according to the invention for supply of current to a welding electrode, comprises an output for output of current from the welding power supply, a direct-current source with a plus pole and a minus pole, a switching device for controlling the current from the direct current source to the output, a current meter for measuring the current to the output, a control unit for control of the direct current source and the switching device, and an input device, which is connected to the control unit, arranged for input of at least a first set point for the current to the output. The control unit is arranged to control the direct current source and the switching device to bring the current to the output in the form of a series of alternating positive current pulses, which have a positive top value, and negative current pulses, which have a negative top value, and to lower the current in the current pulses from the negative top value and the positive top value to a negative switching value and a positive switching value, respectively, before switching between a positive current pulse and a negative current pulse. The control unit is characterized in that it is arranged to control the switching device, in dependence of the measured current and the set first set point, at least with regard to one of the point of time for lowering of the current in the current pulses and the level for at least one of the negative switching value and the positive switching value.

With a welding power supply according to the invention the drawbacks with lowering the current before switching between a positive current pulse and a negative current pulse are minimized. The rectified mean value of the current for a given top value may be maximized with a welding power supply according to the invention. In case that it is the level for at least one of the negative switching value and the positive switching value the welding power supply may be arranged to let at least one of the switching values depend on the first set point of the current. Advantageously the welding power supply is arranged to let the switching value increase with an increasing set point.

Adaptation of the point of time for lowering of the current in the current pulses is advantageously performed in dependence of measured current in earlier transmitted current pulses. Thereby, it is possible to adapt the point of time for lowering of the current to the inductance which is in the welding power supply and to the welding power supply so that the current has had time to sink to the switching value before it is time to switch the direction of the current so that the desired frequency of the current pulses may be maintained. In this way the time from lowering of the current to switching of the current direction may be minimized, which leads to that the arc may be kept stable during welding.

Advantageously, the welding power supply is arranged both for adapting the point of time for lowering of the current and for letting the switching value depend on the set point. With a welding power supply arranged on the described way it is possible to minimize the effect on the rectified mean value of the current which arises by the lowering of the current from the positive top value and the negative top value to the corresponding switching values.

A welding power supply is advantageously arranged to control the top current in the positive and negative current pulses so that the rectified mean value of the current becomes equal to the corresponding set point.

The welding power supply may be arranged so that the negative top value depends on the first set point, wherein the negative switching value is set as a function of the first set point and wherein the switching from a negative current pulse to a positive current pulse takes place after the current has reached said negative switching value. The switching may either occur as soon as the current has reached the negative switching value or at a point of time which is adapted to the desired frequency of current pulses.

The welding power supply may be arranged so that the negative switching value is a linear function of the first set point. Such a dependency is uncomplicated and may easily be achieved with simple means. Alternatively it is of course possible to let the negative switching value has any dependency on the first set point.

The welding power supply may be arranged so that the positive top value depends on the first set point, wherein the positive switching value is set as a function of the set point and wherein the switching from a positive current pulse to a negative current pulse takes place after the current has reached said positive switching value. It is easiest for the operator to only set one set point for the current pulses which controls both the positive current pulses and the negative current pulses.

The welding power supply may be arranged so that the first set point is the set point for the rectified mean value of the current during the negative current pulse and wherein the control unit is arranged to measure the rectified mean value of the current and to set the negative top value so that the rectified mean value of the current during the negative current pulse corresponds to the first set point. With such an arrangement of the welding power supply the negative top value is not directly dependent on the set point but depends on the set point. For a user of the welding power supply this is advantageous in that the welding result primarily is dependent on the rectified mean value of the current.

The input device may also be arranged for input of a second set point for the current to the output.

The positive top value may depend on the second set point, wherein the positive switch value is set as a function of the second set point and wherein the switch from a positive current pulse to a negative current pulse occurs after the current has reached said positive switching value. If it is possible to set two different set points a user of the welding power supply is given a larger possibility to control the welding result.

The set point for the rectified mean value of the current during the positive current pulse may depend on the second set point, wherein the control unit is arranged to measure the rectified mean value of the current and to set the negative top value so that the rectified mean value of the current during the negative current pulse corresponds to the first set point. In the corresponding way as has been described above the top value is in this case not directly dependent on the set point, but for a user of the welding power supply this is advantageous in that the welding result primarily depends on the rectified mean value of the current.

The first set point may be the set point for the frequency with which the current pulses are sent out, wherein the control unit is arranged to control the point of time for the start of the lowering of the current in a positive current pulse in dependence of the time for lowering of the current from the positive top value to the positive switching value in at least one earlier positive current pulse with the same set positive top value. In this way the lowering of the current may be commenced at the correct point of time in order to minimize the time between the point of time for lowering of the current to the point of time for switching of the current direction, at the same time as a certain frequency may be maintained on the current pulses.

The welding power supply may be arranged so that the positive top value depends on the first set point, wherein the positive switching value is set as a function of the first set point and wherein the switching from a positive current pulse to a negative current pulse takes place after the current has reached said positive switching value. This is an equivalence to what has been said above in relation to the negative current pulses, and gives the corresponding advantages as has been described above.

The input device may also be arranged for input of a second set point for the current to the output, wherein the negative top value is dependent on the second set point, and wherein the positive switching value is set as a function of the first set point and wherein the switching from a positive current pulse to a negative current pulse takes place after the current has reached said positive switching value. This is an equivalence to what has been said above in relation to the negative current pulses and gives the corresponding advantages as has been described above.

To sum up, there may be an arbitrary number of set points which are set with the input device. The welding power supply which is settable with a set point for the frequency may also be settable with one or more other set points for the top values in positive, and/or negative current pulses.

The switching device may comprise a first controllable switching element and a second controllable switching element which are connected in series in a first bridge which is connected between the plus pole of the direct current source and the minus pole of the direct current source, as well as a third controllable switching element and a fourth controllable switching element which are connected in series in a second bridge which is connected between the plus pole of the direct current source and the minus pole of the direct current source. The output may be connected to a first connection between the first controllable switching element and the second controllable switching element and to a second connection between the third controllable switching element and the fourth controllable switching element. The first switching element and the third switching element may be connected to the plus pole of the direct current source, and the second switching element and the fourth switching element may be connected to the minus pole of the direct current source.

With such an arrangement of the switching device a good controllability of the current pulses from the welding power supply is provided.

The first controllable switching element and the fourth controllable switching element may be conducting during transmitting of a positive current pulse.

At least one of the controllable switching elements and preferably all the controllable switching elements may be controllable semiconductor elements. Controllable semiconductor elements are preferable in that they provide a good controllability without moving parts.

At least one of the controllable semiconductor elements and preferably each one of the controllable semiconductor elements may be an IGBT-transistor (bipolar transistor with isolated gate). Such transistors provides good controllability with a minimum of surrounding components in order to control the switching elements at the same time as they may be used for large currents. It is of course possible to alternatively use other switching elements such as for example thyristors or other types of transistors.

Parallely with each one of the switching elements there may be arranged an over voltage protection. The over voltage protections results in the voltage over the switching elements being limited to a level which not risk to damage the switching elements.

The over voltage protections may comprise zener diodes, but may also be comprised of other elements with the corresponding function.

The welding power supply may be arranged to turn off the direct current source in order to lower the current in the current pulses from the negative top value and the positive top value to the negative switching value and the positive switching value, respectively. By turning off the direct current source the time for lowering the current from any one of the top values to the corresponding switching value is minimized.

The control unit in the welding power supply may comprise a micro processor. It is, of course, possible to achieve control unit without the use of a micro processor, but the use of a micro processor makes it possible to easier program the control unit in different ways depending on the circumstances in which the welding power supply is to work.

The control unit may be arranged to measure the rectified mean value of the current from the output and to adjust the current from the direct current source so that the rectified mean value of the current corresponds to the set point of the current. For measurement of the current the control unit may either comprise a current meter or be connected to a current meter.

The control unit may be arranged to monitor the direct current source, and if the direct current source delivers maximum current during a time period which exceeds a maximum time, to lower the set point for the current so that the direct current source supplies a current below the maximum value. With such an arrangement of the control unit it is provided that the direct current source is not overloaded. A reason for the direct current source to have to supply maximum current during longer time than a predetermined maximum time may be that the inductance in the welding cables which are connected to the output is too large.

The control unit may be arranged for measurement of the inductance in the welding cables and the switching device. The control unit may be arranged to only allow welding with a limited set point for the current, which set point is a function of the inductance, if the inductance exceeds a maximum inductance value. By such an arrangement the high voltages, which are the result when high currents are to switch direction in cables which high inductance, is avoided.

The welding power supply may be arranged so that there parallely with the first bridge and the second bridge is arranged a capacitor device, which is arranged to be charged during switching between a positive current pulse and a negative current pulse.

In such a welding power supply the control unit for measurement of the inductance in the welding cables and the switching device may be arranged to perform commutations with a predetermined starting value on the current, and to measure the voltage over the capacitor device during the commutations. The control unit may be arranged to lower the current from the starting value until the voltage over the capacitor device is below a maximum test top value during the commutations. The control unit is further arranged to measure the switching value of the current when the voltage is below the maximum test top value and to calculate an inductance value starting from the measured switching value of the current and the measured voltage over the capacity device.

Alternatively the control unit may be arranged to send out a positive current pulse and a negative current pulse with a predetermined test top value, to measure the time for the current to sink from the test top value to the corresponding switching value and to compare the measured time with a predetermined maximum test time. Such a measurement of the time for the current to sink may be combined with the above described measurement of whether the direct current source delivers maximum current during longer time than a predetermined maximum time.

The inductance measurement may either be performed automatically each time the welding power supply is started or on command from the user of the welding power supply.

As an alternative to only allowing welding with a limited set point for the current, the control unit may be arranged to turn off the welding power supply if the measured inductance is too high, i.e., exceeds the maximum inductance value. Alternatively the control unit may be arranged to warn the operator about the inductance being too high and/or lower the switching value for the current as has been described above.

According to a second aspect of the present invention a method is provided for control of the current in a welding power supply for supplying current from an output to a welding electrode in the form of a series of alternating positive current pulses, having a positive top value, and negative current pulses, having a negative top value. The method comprises the steps of receiving at least a first set point for the current to the output and to measure the current to the output, to lower the current in the current pulses from the negative top value and the positive top value to a negative switching value and a positive switching value, respectively, before switching between a positive current pulse and a negative current pulse. The method is characterized in that it further comprises the steps of controlling the current pulses in dependence of the measured current and the said first set point at least with regard to one of the point of time for lowering of the current in the current pulses and the level for at least one of the negative switching value and the positive switching value.

A method according to the second aspect of the invention has the corresponding advantages as has been described for a welding power supply according to the first aspect of the present invention.

According to a third aspect of the present invention a computer program product is provided on which there is stored a computer program for control of a welding power supply with an output. During execution on a computer the computer program makes the computer send out control signals to control the current from the output to a series of alternating positive current pulses, having a positive top value and negative current pulses, having a negative top value. The computer program also makes the computer being receptive to at least a first set point for the current to the output, to be receptive to a signal with information on a measured current to the output, to send out a control signal for lowering of the current in the current pulses from the negative top value and the positive top value to a negative switching value and a positive switching value, respectively, before switching between a positive current pulse and a negative current pulse. The computer program product is characterized in that the computer program further makes the computer, in dependence of the received measured current and the set first set point, to control the current pulses at least with regard to one of the point of time for lowering of the current in the current pulses and the level for at least one of the negative switching value and the positive switching value.

The features which have been described in connection with the first aspect of the present invention may also be combined with a method and a computer program product where applicable.

The above described features may of course be combined in the same embodiment where applicable.

In the following, preferred embodiments of the invention will be described with reference to the appended drawings.

SHORT DESCRIPTION OF THE DRAWINGS

DESCRIPTION OF PREFERRED EMBODIMENTS

Figure 1:
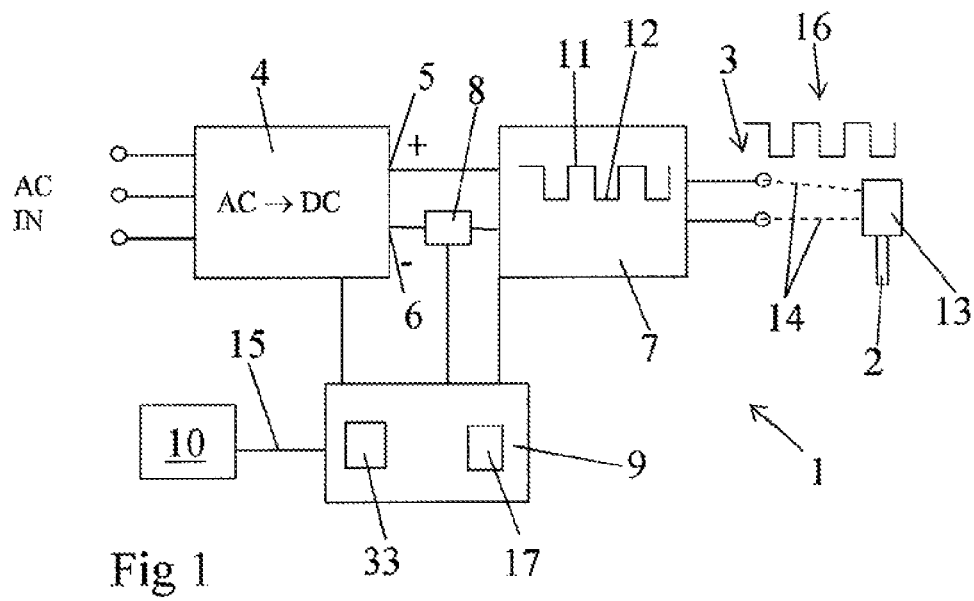
FIG. 1 shows schematically a welding power supply according to an embodiment of the present invention.

In the following description of preferred embodiments of the invention corresponding features in the different features will be denoted with the same reference numeral.

FIG. 1 shows schematically a welding power supply 1 according to an embodiment of the present invention, which welding power supply 1 is arranged for supply of current to a welding electrode 2. The welding power supply comprises an output 3 for output of current from the welding power supply 1, a direct current source 4 with a plus pole 5 and a minus pole 6 and a switching device 7 for control of the current from the direct current source 4 to the output 3. The welding electrode 2 is arranged in a holding member 13 which is connected to the output 3 by means of welding cables 14 which are shown dotted in the figure. The welding power supply 1 further comprises a current meter 8 for measurement of the current to the output 3 by measurement of the current froth the direct current source 4. The welding power supply further comprises a control unit 9 for control of the direct current source 4 and the switch device 7, and an input device 10, which is connected to the control unit 9, arranged for input of a first set point, a second set point and a third set point for the current to the output 3. The input device may be any type of input device and may be connected in an arbitrary way to the control unit. The input device may for example comprise one or more of a keyboard, a keypad, a set of buttons, a rotary control, a push control or a touch sensitive screen. The input device may alternatively comprise any other type of input device known to a man skilled in the art. The input device may be fixed connected to the control unit or may be wirelessly connected to the control unit. In the figure the connection between the control unit and the input device is shown with the line 15.

Figure 2:
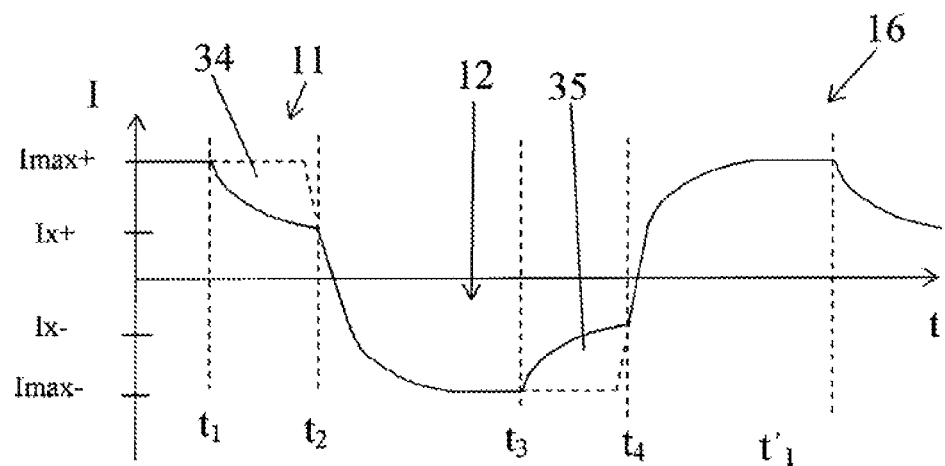
FIG. 2 shows schematically the current from the output on the welding power supply as a function of time during welding.

In FIG. 2 the form of the current from the output 3 during welding is shown in larger detail. The control unit 9 is arranged to control the direct current source 4 and the switch device 7 to transmit the current to the output 3 in the form of a series of alternating positive current pulses 11, which have a positive top value Imax+, and negative current pulses 12, which have a negative top value Imax, and to lower the current in the current pulses from the negative top value Imax and the positive top value Imax+ to a negative switch value Ix− and a positive switch value Ix+, respectively, before the switch between a positive current pulse 11 and the negative current pulse 12 which is illustrated with the pulse train 16 at the output 3. The positive top value Imax+ may according to an embodiment be chosen to be equal to the first set point and the negative top value Imax− may be chosen to be equal to the second set point. According to an embodiment of the invention the current Imax+ is fed from the output 3 a time after the switch to the positive current pulse 11. At the point of time $t_1$ the direct current source 4 is turned off which leads to the current decreasing. The current is allowed to decrease until the point of time $t_2$ when the current has decreased to the predetermined positive switch value Ix+. When the current has reached the positive switch value Ix+ the direct current source is turned on again in order to prevent the current from sinking below the positive switch value. At the point of time $t_2$ the current from the output 3 is switched so that the current gets the opposite direction through the welding electrode 2 at the same time as the feeding of current from the direct current source 4 is turned on again. Between the point of time $t_2$ and the point of time $t_3$ the current is then allowed to approach the negative top value Imax− in order to then stay at the negative top value Imax− until the point of time $t_3$ when the direct current source is again turned off in order to allow the current to sink from the negative top value Imax−. The current is allowed to decrease until the point of time $t_4$ when the current has decreased to the predetermined negative switch value Ix−. When the current has reached the negative switch value Ix− the direct current source 4 is again turned on in order to prevent the current from sinking below the negative switch value Ix−. At the point of time $t_4$ the current is switched from the output 3 so that the current gets the opposite direction through the welding electrode 2 at the same time as the feeding of current from the direct current source 4 is again turned on. Between the point of time $t_4$ and the point of time 5 the current is then allowed to approach the positive top value Imax+ in order to then stay at the positive top value Imax+ until the point of time $t'_1$ when the direct current source is again turned off in order to allow the current to decrease from the positive top value Imax+. A period for the current pulses extends between the point of time $t_1$ and $t_{1'}$. The period is the inverse of the frequency which is set with the third set point.

With a welding power supply according to the present invention a first surface 34 and a second surface 35 in the figure may be minimized.

The point on time $t_1$ for shutting off the direct current source 4 is chosen based on at least one earlier measurement of the time from the shut off of the direct current source until the current has reached the positive switch value Ix+. The point of time $t_2$ is chosen in the corresponding way.

In the illustrated embodiment the positive switch value is a linear function of the positive top value and the negative switch value is a linear function of the negative top value. The linear functions may be different or the same for the negative current pulses and the positive current pulses. The linear functions may for example be chosen as a constant multiplied with the negative or the positive top value. It is of course also possible to let the positive switch value be a non linear function of the positive top value and to let the negative switch value be a non linear function of the negative top value.

According to an alternative embodiment of the present invention the current from the direct current source is regulated so that the measured rectified mean value of the current becomes equal to the set set points. As the rectified mean values for the positive and the negative current pulses are less then the top values this will lead to an increase of the positive top value and the negative top value.

According to the embodiment which is shown in FIG. 1 the control unit comprises a microprocessor 17. The control unit may be an ordinary programmable computer. A computer program according to an embodiment of the invention is programmed to control the direct current source and the switch device according to the description above.

Figure 3:
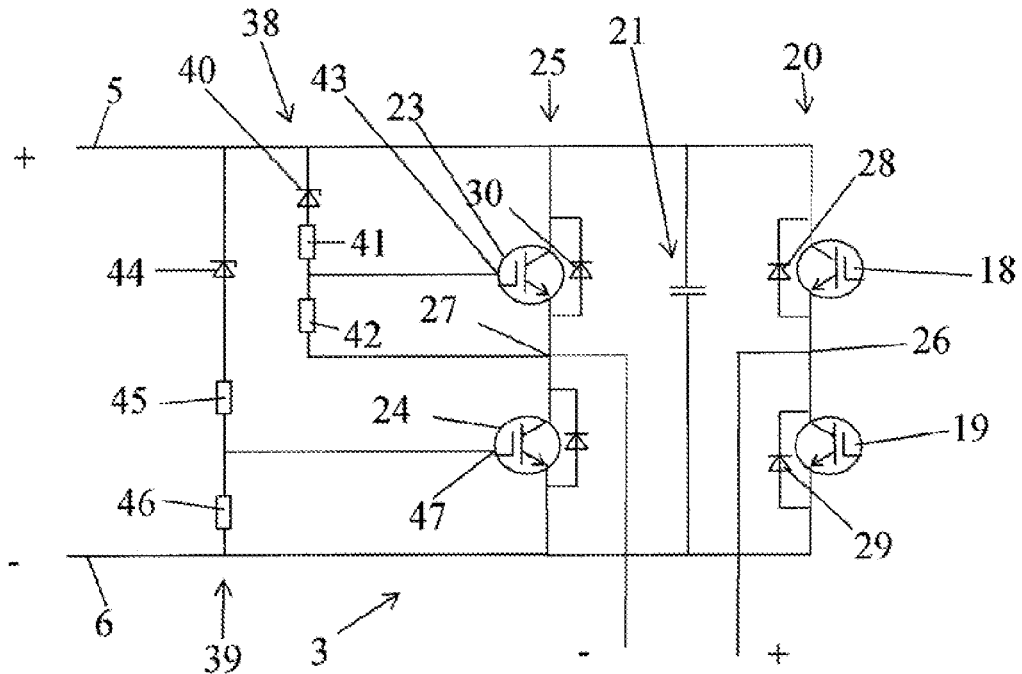
FIG. 3 shows in larger detail a part of the welding power supply in FIG. 1.

FIG. 3 shows in larger detail the switch device 7 in FIG. 1. The switch device 7 comprises a first controllable switch element 18 and a second controllable switch element 19 in the form of bipolar transistors with isolated gate. The first controllable switch element 18 and the second controllable switch element 19 are connected in series in a first bridge 20 which is connected between the plus pole 5 of the direct current source and the minus pole 6 of the direct current source. The switch device 7 also comprises a third controllable switch element 23 and a fourth controllable switch element 24 in the form of bipolar transistors with isolated gate. The third controllable switch element 23 and the fourth controllable switch element 24 are connected in series in a second bridge 25 which is connected between the plus pole 5 of the direct current source and the minus pole 6 of the direct current source. The output 3 is connected to a first connection 26 between the first controllable switch element 18 and the second controllable switch element 19 and to a second connection 27 between the third controllable switch element 23 and the fourth controllable switch element 24. The first switch element 18 and the third switch element 23 are connected to the plus pole 5 of the direct current source, while the second switch element 19 and the fourth switch element 24 are connected to the minus pole 6 of the direct current source. Parallely with the first switch element 18, the second switch element 19, the third switch element 23 and the fourth switch element 24, there is arranged a first free wheeling element 28, a second free wheeling element 29, a third free wheeling element 30 and a fourth free wheeling element 31, respectively. The free wheeling elements 28-31 are comprised of diodes according to an embodiment of the invention. A capacitor 21 is arranged parallely with the first bridge 20 and the second bridge 25.

In order to clearly illustrate the invention the control electronics, which is connected to the gates on the controllable switch elements 18, 19, 23, 24, in order to enable control of the controllable switch elements, is not shown in FIG. 3.

The switch device also comprises a first over voltage protection 38 which is connected parallely with the third controllable switch element 23, and a second over voltage protection 39 which is connected parallely with the fourth controllable switch element 24. The first over voltage protection 38 comprises a first zener diode 40, a first resistor 41 and a second resistor 42. The gate 43 on the third controllable switch element 23 is connected between the first resistor 41 and the second resistor 42. The second over voltage protection 39 comprises a second zener diode 44, a third resistor 45 and a fourth resistor 46. The gate 47 on the fourth controllable switch element 24 is connected between the third resistor 45 and the fourth resistor 46.

Advantageously the over voltage protection according to the description above are also connected parallely to the first controllable switch element 18 and the second controllable switch element 19. These are, however, not shown in FIG. 3 in order to make FIG. 3 more clear.

The first controllable switch element 18 and the fourth controllable switch element 24 are conducting during transmitting of a positive current pulse. During switching from the positive current pulse to a negative current pulse the control unit 9 first controls the direct current source 4 to stop feeding current to the switch device 7 at the point of time $t_1$, which will lead to the current to the welding electrode decreasing. When the current has decreased to the positive switch value Ix+, which occurs at the point of time $t_2$, all switch elements 18, 19, 23, 24 are short circuited. The current will then continue to flow through the first switch element 18 and the first connection point 26 to the welding electrode and from the welding electrode 2 through the second connection point 27 and the fourth switch element 24. After a short time period the first switch element 18 and the fourth switch element 24 are blocked so that they do not conduct current anymore. Due to the inductance in the welding cables 14 and the welding electrode 2 the current will however continue to flow in the same direction through the welding cables 14 and the welding electrode 2. The current to the first connection point 26 will therefore flow as a free wheeling current through the second free wheeling element 29, while the current from the second connection point 27 will flow as a free wheeling current through the third free wheeling element 30. The current through the welding cables, the second free wheeling element 29 and the third free wheeling element 30 charges the capacitor 21 to a voltage which among other things depends on the inductance in the welding cables 14 and the size of the capacitor 21. When the voltage over the capacitor 21 has become sufficiently large the current reverses and flows from the capacitor 21 and the direct current source 4 through the third switch member 23 through the second connection point 27 and the welding electrode 2 and further through the first connection point 26 and the second switch member 19. The current then increases towards the negative top value Imax− until it is again time to switch to a positive current pulse, which takes place in the corresponding way as the switch to a negative current pulse.

After the third controllable switch element 23 has stopped conducting in connection with a switch of the current direction from the welding power supply 1, the voltage over the third controllable switch element 23 will grow. If the voltage over the third controllable switch element becomes sufficiently high the first zener diode 40 will begin to conduct current which leads to that current will reach the gate 43 on the third controllable switch element 23 which then will begin to conduct current which leads to that the voltage over the third controllable switch element 23 decreasing. The first resistor 41 and the second resistor 42 will make sure that the voltage on the gate becomes correct.

Figure 4:
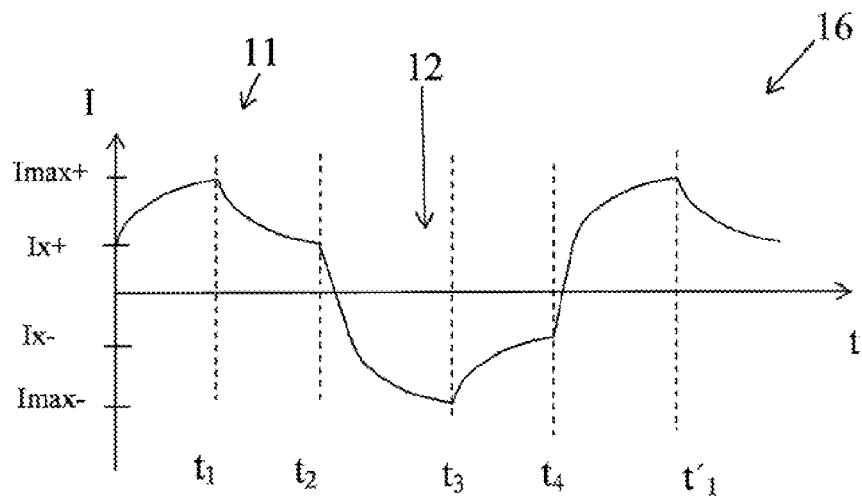
FIG. 4 shows schematically the current from the output on the welding power supply as a function of time during welding with large inductance in the welding cables.

FIG. 4 shows schematically the current from the output on the welding power supply 1 as a function of time during welding with large inductance in the welding cables 14. As is evident from FIG. 4 the current has time to reach its positive top value Imax+ and its negative top value Imax−, respectively, due to the large inductance. This will lead to the direct current source 4 delivering maximum current in order for the current to reach the desired value. This may lead to that the direct current source 4 is weared out prematurely. In order to avoid this the control unit 9 is arranged to monitor so that the current from the direct current source 4 is not maximum during a longer period of time than a predetermined maximum time. If the maximum period of time is exceeded the control unit controls the direct current source 4 to decrease the current until the maximum time no longer is exceeded. The operator will be made aware of this via a display 33.

The control unit 9 may be arranged for measurement of the inductance in the welding cables 14 and the switch device 7. The control unit is arranged to only allow welding with a limited set point for the current, which set point is a function of the inductance, if the inductance exceeds a maximum inductance value.

For measurement of the inductance in the welding cables 14 and the switch device 7 the control unit 9 is arranged to control the switch device 7 to perform commutations with a predetermined start value on the current. The control unit 9 measures the voltage over the capacitor device 21 during the commutations and lowers the rectified mean value of the current until the voltage over the capacitor device 21 is below a maximum test top value during the commutations. When the voltage is below the maximum test top value, the control unit 9 measures the switch value for the current and calculates an inductance value using the measured switch value for the current and the measured voltage over the capacitor device 21.

Alternatively the control unit 9 may be arranged to send out a positive current pulse 11 or a negative current pulse 12 in the welding cables 14 at start of a welding process and to then measure the time for the current to sink from the positive top value Imax+ or the negative top value Imax−. The measurement value is a measure of the inductance in the welding cables 14. Then the control unit 9 compares the measurement value with a maximum value stored in the control unit 9. Alternatively the measurement value may be used to calculate an inductance value which is compared with a maximum inductance value stored in the control unit. If the measurement value is larger than the stored maximum value or if the inductance value is larger than the maximum inductance value welding is allowed only with a limited set point for the current, which set point is dependent on the measured inductance value. Alternatively welding is not allowed at all and the operator is made aware of this on the display 33.

The welding power supply 1 and the method according to the invention may be modified in many ways without departing from the spirit and scope of the present invention, which is limited only by the appended claims.

In the shown embodiment the direct current source 4 has an input for three phases. It is however, possible to have a direct current source which has an input only for one phase and a neutral wire.

In the description above the set point is a desired rectified mean value of the current. Alternatively the set point may be a desired effective value on the current.

The invention claimed is:

1. A welding power supply for supplying current to a welding electrode, comprising an output for output of current from the welding power supply, a direct current source with a plus pole and a minus pole, a switch device for control of the current from the direct current source to the output, a current meter for measurement of the current to the output, a control unit for control of the direct current source and the switch device, and an input device, which is connected to the control unit, arranged for input of at least a first set point for the current to the output, wherein the control unit is arranged to control the direct current source and the switch device to feed current to the output in the form of a series of alternating positive current pulses, which have a positive top value, and negative current pulses, which have a negative top value, and to lower the current in the current pulses from the negative top value and the positive top value to a negative switch value and a positive switch value, respectively, before switching between a positive current pulse and a negative current pulse, wherein the control unit is further arranged to control the switch device at least with regard to one of the point of time for lowering of the current in the current pulses and the level for at least one of the negative switch value and the positive switch value, in dependence of the measured current and the first set point; and wherein the negative top value depends on the first set point, wherein the negative switch value is set as a function of the first set point and wherein the switch from a negative current pulse to a positive current pulse occurs after the current has reached said negative switch value.

2. A welding power supply according to claim 1, wherein the negative switch value is a linear function of the first set point.

3. A welding power supply according to claim 1, wherein also the positive top value depends on the first set point, wherein the positive switch value is set as a function of the set point and wherein the switch from a positive current pulse to a negative current pulse takes place after the current has reached said negative switch value.

4. A welding power supply according to claim 1, wherein the first set point is the set point for the rectified mean value of the current during the negative current pulse, and wherein the control unit is arranged to measure the rectified mean value of the current and to set the negative top value so that the rectified mean value of the current during the negative current pulse corresponds to the first set point.

5. A welding power supply according to claim 1, wherein the input device also is arranged for input of a second set point for the current to the output.

6. A welding power supply for supplying current to a welding electrode, comprising an output for output of current from the welding power supply, a direct current source with a plus pole and a minus pole, a switch device for control of the current from the direct current source to the output, a current meter for measurement of the current to the output, a control unit for control of the direct current source and the switch device, and an input device, which is connected to the control unit, arranged for input of at least a first set point for the current to the output, wherein the control unit is arranged to control the direct current source and the switch device to feed current to the output in the form of a series of alternating positive current pulses, which have a positive top value, and negative current pulses, which have a negative top value, and to lower the current in the current pulses from the negative top value and the positive top value to a negative switch value and a positive switch value, respectively, before switching between a positive current pulse and a negative current pulse, wherein the control unit is further arranged to control the switch device at least with regard to one of the point of time for lowering of the current in the current pulses and the level for at least one of the negative switch value and the positive switch value, in dependence of the measured current and the first set point; wherein the input device also is arranged for input of a second set point for the current to the output; and wherein the positive top value depends on the second set point, wherein the positive switch value is set as a function of the second set point and wherein the switch from a positive current pulse to a negative current pulse takes place after the current has reached said positive switch value.

7. A welding power supply according to claim 6, wherein the second set point is the set point for the rectified mean value of the current during the positive current pulse, and wherein the control unit is arranged to measure the rectified mean value of the current and to set the negative top value so that the rectified mean value of the current during the negative current pulse corresponds to the first set point.

8. A welding power supply according to claim 1, wherein the positive top value depends on the first set point, and wherein the positive switch value is set as a function of the first set point and wherein the switch from a positive current pulse to a negative current pulse takes place after the current has reached said positive switch value.

9. A welding power supply according to claim 8, wherein the input device also is arranged for input of a second set point for the current to the output, wherein the negative top value is dependent on the second set point, and wherein the positive switch value is set as a function of the first set point and wherein the switch from a positive current pulse to a negative current pulse takes place after the current has reached said positive switch value.

10. A welding power supply according to claim 1, wherein the first set point is the set point for the frequency with which the current pulses are transmitted and wherein the control unit is arranged to control the point of time for start of the lowering of the current in a positive current pulse in dependence of the time for lowering of the current from the positive top value to the positive switch value in at least one earlier positive current pulse with the same set positive top value.

11. A welding power supply for supplying current to a welding electrode, comprising an output for output of current from the welding power supply, a direct current source with a plus pole and a minus pole, a switch device for control of the current from the direct current source to the output, a current meter for measurement of the current to the output, a control unit for control of the direct current source and the switch device, and an input device, which is connected to the control unit, arranged for input of at least a first set point for the current to the output, wherein the control unit is arranged to control the direct current source and the switch device to feed current to the output in the form of a series of alternating positive current pulses, which have a positive top value, and negative current pulses, which have a negative top value, and to lower the current in the current pulses from the negative top value and the positive top value to a negative switch value and a positive switch value, respectively, before switching between a positive current pulse and a negative current pulse, wherein the control unit is further arranged to control the switch device at least with regard to one of the point of time for lowering of the current in the current pulses and the level for at least one of the negative switch value and the positive switch value, in dependence of the measured current and the first set point; and wherein the switch device comprises a first controllable switch element and a second controllable switch element which are connected in series in the first bridge which is connected between the plus pole of the direct current source and the minus pole of the direct current source, as well as a third controllable switch element and a fourth controllable switch element which are connected in series in a second bridge which is connected between the plus pole of the direct current source and the minus pole of the direct current source, wherein the output is connected to a first connection between the first controllable switch element and the second controllable switch element and to a second connection between the third controllable switch element and the fourth controllable switch element, wherein the first switch element and the third switch element are connected to the plus pole of the direct current source, and wherein the second switch element and the fourth switch element are connected to the minus pole of the direct current source.

12. A welding power supply according to claim 11, wherein the first controllable switch element and the fourth controllable switch element are conducting during transmittance of a positive current pulse.

13. A welding power supply according to claim 12, wherein at least one of the controllable switch elements, preferably all the controllable switch elements, are controllable semiconductor elements.

14. A welding power supply according to claim 13, wherein at least one of the controllable semiconductor elements, and preferably each one of the controllable semiconductor elements, is an IGBT-transistor (bipolar transistor with isolated gate).

15. A welding power supply according to claim 11, wherein there is arranged an over voltage protection parallely with each one of the switching elements.

16. A welding power supply according to claim 15, wherein the over voltage protections comprises zener diodes.

17. A welding power supply according to claim 1, wherein the welding power supply is arranged to turn off the direct current source in order to lower the current in the current pulses from the negative top value and the positive top value to the negative switch value and the positive switch value, respectively.

18. A welding power supply according to claim 17, wherein the control unit comprises a microprocessor.

19. A welding power supply for supplying current to a welding electrode, comprising an output for output of current from the welding power supply, a direct current source with a plus pole and a minus pole, a switch device for control of the current from the direct current source to the output, a current meter for measurement of the current to the output, a control unit for control of the direct current source and the switch device, and an input device, which is connected to the control unit, arranged for input of at least a first set point for the current to the output, wherein the control unit is arranged to control the direct current source and the switch device to feed current to the output in the form of a series of alternating positive current pulses, which have a positive top value, and negative current pulses, which have a negative top value, and to lower the current in the current pulses from the negative top value and the positive top value to a negative switch value and a positive switch value, respectively, before switching between a positive current pulse and a negative current pulse, wherein the control unit is further arranged to control the switch device at least with regard to one of the point of time for lowering of the current in the current pulses and the level for at least one of the negative switch value and the positive switch value, in dependence of the measured current and the first set point; and wherein the control unit is arranged to measure the rectified mean value of the current from the output and to control the current from the direct current source so that the rectified mean value of the current corresponds to the first set point of the current.

20. A welding power supply according to claim 1, wherein the control unit is arranged to monitor the direct current source, and, if the direct current source supplies maximum current during a time which exceeds a maximum time, to lower the set point for the current so that the direct current source supplies a current below the maximum value.

21. A welding power supply according to claim 1, wherein the control unit is arranged for measurement of the inductance in the welding cables and the switch device, wherein the control unit is arranged to allow welding only with a limited set point for the current, which set point is a function of the inductance, if the inductance exceeds a maximum inductance value.

22. A welding power supply according to claim 21, wherein the welding power supply for measurement of the inductance in the welding cables and the switch device is arranged to transmit a positive current pulse and a negative current pulse with a predetermined test top value, to measure the time for the current to fall from the test top value to the corresponding switch value and to compare the measured time with a predetermined maximum test time.

23. A welding power supply according to claim 22, wherein the control unit is arranged to turn off the welding power supply if the measured time exceeds the maximum test time.

24. A welding power supply according to claim 21, wherein there is arranged, parallely to the first bridge and the second bridge, a capacitor device, which is arranged to be charged during switch between a positive current pulse and a negative current pulse.

25. A welding power supply according to claim 21, wherein the control unit for measurement of the inductance in the welding cables and the switch device is arranged to perform commutations with a predetermined start value on the current, to measure the voltage over the capacitor device during the commutations, to lower the current from the start value until the voltage over the capacitor device is below a maximum test top value during the commutations, to measure the switch value for the current when the current is below the maximum test top value, to calculate an inductance value from the measured switch value on the current and the measured voltage over the capacitor device when the voltage is below the maximum test top value.

26. A method for controlling a current in a welding power supply for supplying current from an output to a welding electrode in the form of a series of alternating positive current pulses, having a positive top value, and negative current pulses, having a negative top value wherein the method comprises:
receiving at least a first set point for the current to the output,
measuring the current to the output,
lowering the current in the current pulses from the negative top value and the positive top value to a negative switch value and a positive switch value, respectively, before switching between a positive current pulse and a negative current pulse, and
controlling, in dependence of the measured current and the first set point, the current pulses at least with the regard to one of the point of time for lowering of the current in the current pulses and the level for at least one of the negative switch value and the positive switch value; and
wherein the negative top value depends on the first set point, wherein the negative switch value is set as a function of the first set point and wherein the switch from a negative current pulse to a positive current pulse occurs after the current has reached said negative switch value.

27. A computer program product on which there is stored a computer program for controlling a welding power supply with an output, which computer program during execution on a computer makes the computer send out control signals for:
controlling the current from the output to a series of alternating positive current pulses, having a positive top value, and negative current pulses, having a negative top value, wherein the computer program also makes the computer:
be receptable for at least the first set point for the current to the output,
be receptable for a signal with information on a measured current to the output,
to send out a control signal for lowering of the current in the current pulses from the negative top value and the positive top value to a negative switch value and a positive switch value, respectively, before switch between a positive current pulse and a negative current pulse, and
control, in dependence of the received measured current and the first set point, the current pulses at least with regard to one of the point of time for lowering of the current in the current pulses and the level for at least one of the negative switch value and the positive switch value; and
wherein the negative top value depends on the first set point, wherein the negative switch value is set as a function of the first set point and wherein the switch from a negative current pulse to a positive current pulse occurs after the current has reached said negative switch value.

* * * * *